(12) United States Patent
Miyamoto et al.

(10) Patent No.: US 12,435,878 B2
(45) Date of Patent: Oct. 7, 2025

(54) GAS TURBINE COMBUSTOR WITH LESS COMBUSTABLE FUEL AND HIGHLY COMBUSTIBLE FUEL RATIO CONTROL

(71) Applicant: MITSUBISHI HEAVY INDUSTRIES, LTD., Tokyo (JP)

(72) Inventors: Kenji Miyamoto, Kanagawa (JP); Sosuke Nakamura, Kanagawa (JP); Taku Egawa, Kanagawa (JP); Tomo Kawakami, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/269,115

(22) PCT Filed: Dec. 28, 2021

(86) PCT No.: PCT/JP2021/048742
§ 371 (c)(1),
(2) Date: Jun. 22, 2023

(87) PCT Pub. No.: WO2022/149540
PCT Pub. Date: Jul. 14, 2022

(65) Prior Publication Data
US 2024/0125476 A1  Apr. 18, 2024

(30) Foreign Application Priority Data
Jan. 8, 2021 (JP) .................................. 2021-002117

(51) Int. Cl.
*F23R 3/36* (2006.01)
*F02C 9/40* (2006.01)
*F23R 3/26* (2006.01)

(52) U.S. Cl.
CPC .................. *F23R 3/36* (2013.01); *F02C 9/40* (2013.01); *F23R 3/26* (2013.01); *F05D 2240/35* (2013.01); *F05D 2270/303* (2013.01)

(58) Field of Classification Search
CPC .... F02C 7/22; F02C 7/228; F02C 9/40; F02C 7/222; F02C 7/232; F23R 3/36;
(Continued)

(56) References Cited

U.S. PATENT DOCUMENTS 4,949,538 A * 8/1990 Iasillo ...................... F02C 7/228
60/39.465
6,209,310 B1 * 4/2001 Kuenzi ................... F02C 7/228
60/39.3
(Continued)

FOREIGN PATENT DOCUMENTS

DE   102010038124   4/2011
JP   2007-077867   3/2007
(Continued)

OTHER PUBLICATIONS

International Search Report issued Mar. 8, 2022 in International Application No. PCT/JP2021/048742, with English translation.
(Continued)

*Primary Examiner* — Alain Chau
(74) *Attorney, Agent, or Firm* — Wenderoth, Lind & Ponack, L.L.P.

(57) ABSTRACT

A gas turbine combustor according to at least one embodiment, includes: a less combustible fuel flow control part for controlling, independently of each other, amounts of less combustible fuel supplied to a first fuel injector and a second fuel injector; a highly combustible fuel flow control part for controlling, independently of each other, amounts of highly combustible fuel having a higher combustion speed than the less combustible fuel and supplied to the first fuel injector
(Continued)

and the second fuel injector; and a controller configured to control the less combustible fuel flow control part and the highly combustible fuel flow control part such that a relative ratio of a first ratio of the highly combustible fuel to whole of first fuel injected by the first fuel injector and a second ratio of the highly combustible fuel to whole of second fuel injected by the second fuel injector changes according to an operating condition of a gas turbine.

14 Claims, 10 Drawing Sheets

(58) Field of Classification Search
CPC .. F23R 3/343; F23R 2900/00002; F23R 3/34; F05D 2220/75
See application file for complete search history.

(56) References Cited

U.S. PATENT DOCUMENTS

| | | | | |
|---|---|---|---|---|
| 6,250,065 | B1* | 6/2001 | Mandai | F02C 7/232 60/776 |
| 6,640,548 | B2* | 11/2003 | Brushwood | F02C 7/236 60/776 |
| 7,921,651 | B2* | 4/2011 | Alexander | F23R 3/36 60/776 |
| 8,613,187 | B2* | 12/2013 | Khan | F02C 7/22 60/734 |
| 8,973,366 | B2* | 3/2015 | Zhang | F23K 5/12 60/734 |
| 9,243,804 | B2* | 1/2016 | Zhang | F02C 3/30 |
| 10,012,387 | B2* | 7/2018 | Patel | F23R 3/28 |
| 10,227,921 | B2* | 3/2019 | Zhang | F23R 3/36 |
| 10,590,850 | B2* | 3/2020 | Ogata | F23R 3/286 |
| 11,421,599 | B2* | 8/2022 | Horikawa | F23R 3/346 |
| 11,746,704 | B2* | 9/2023 | Asai | F02C 9/40 60/776 |
| 2007/0031768 | A1* | 2/2007 | Schefer | F23L 7/00 431/4 |
| 2007/0079593 | A1 | 4/2007 | Fujii et al. | |
| 2009/0223226 | A1* | 9/2009 | Koizumi | F02C 7/232 60/737 |
| 2009/0272118 | A1* | 11/2009 | Alexander | F02C 9/40 60/39.463 |
| 2010/0095649 | A1 | 4/2010 | Blouch et al. | |
| 2010/0170253 | A1* | 7/2010 | Berry | F23R 3/286 60/742 |
| 2011/0094234 | A1 | 4/2011 | Khan et al. | |
| 2011/0126545 | A1* | 6/2011 | Loeven, II | F23R 3/36 60/39.281 |
| 2011/0289932 | A1* | 12/2011 | Thompson | F02C 3/30 60/776 |
| 2011/0296844 | A1 | 12/2011 | Widener et al. | |
| 2013/0098041 | A1* | 4/2013 | Zhang | F23K 5/005 60/734 |
| 2013/0247578 | A1 | 9/2013 | Deuker et al. | |
| 2014/0000274 | A1* | 1/2014 | Srinivasan | F02C 9/40 60/776 |
| 2014/0157788 | A1* | 6/2014 | Bathina | F23L 7/00 60/737 |
| 2016/0084160 | A1* | 3/2016 | Zhang | F23R 3/36 60/39.53 |
| 2016/0161123 | A1* | 6/2016 | Patel | F02C 7/232 60/740 |
| 2017/0298884 | A1* | 10/2017 | Patel | F02M 61/16 |
| 2017/0299190 | A1* | 10/2017 | Patel | F02C 7/22 |
| 2017/0321609 | A1* | 11/2017 | Ogata | F02C 7/228 |
| 2020/0080480 | A1* | 3/2020 | Horikawa | F23R 3/346 |
| 2021/0010675 | A1* | 1/2021 | Bouten | F23R 3/36 |
| 2021/0095599 | A1* | 4/2021 | Asai | F02C 7/228 |
| 2021/0277796 | A1* | 9/2021 | McCambridge | F02C 9/40 |

FOREIGN PATENT DOCUMENTS

| | | |
|---|---|---|
| JP | 2010-96488 | 4/2010 |
| JP | 2011-89761 | 5/2011 |
| JP | 2011-137390 | 7/2011 |
| JP | 2011-252494 | 12/2011 |
| JP | 2013-545022 | 12/2013 |
| JP | 5873239 | 3/2016 |
| JP | 6431893 | 11/2018 |
| WO | 2014/149190 | 9/2014 |
| WO | 2019/048387 | 3/2019 |

OTHER PUBLICATIONS

International Preliminary Report on Patentability issued Jul. 20, 2023 in International Application No. PCT/JP2021/048742, with English translation.
Office Action issued Nov. 21, 2024 in corresponding Korean application No. 10-2023-7021005, with machine translation.
Office Action issued Jul. 22, 2025 in corresponding DE application No. 112021005603.4, with machine translation, 9 pages.

* cited by examiner

GAS TURBINE COMBUSTOR WITH LESS COMBUSTABLE FUEL AND HIGHLY COMBUSTIBLE FUEL RATIO CONTROL

TECHNICAL FIELD

The present disclosure relates to a gas turbine combustor and a gas turbine. This application claims the priority of Japanese Patent Application No. 2021-002117 filed on Jan. 8, 2021, the content of which is incorporated herein by reference.

BACKGROUND

For example, in a gas turbine for power generation, an operating condition may be switched to turndown operation in order to cope with a fluctuation in power demand during the day or at night. In the turndown operation, the gas turbine is operated at a low output relative to during rated operation by reducing the flow rate of a combustion gas passing through a turbine (see Patent Document 1, for example).

CITATION LIST

Patent Literature

Patent Document 1: JP2011-137390A

SUMMARY

Technical Problem

If the output is reduced by performing the turndown operation of the gas turbine, a combustion temperature in a combustor decreases, resulting in an increase in generation of an unburned substance such as carbon monoxide or hydrocarbon, or occurrence of a combustion vibration. However, in order to flexibly cope with the above-described fluctuation in power demand, it is required to widen an operating range of the gas turbine by reducing an output lower limit value in the turndown operation.

In order to reduce the output lower limit value in the turndown operation, it is desirable to perform mixed-combustion of highly combustible fuel, such as hydrogen, having a relatively high combustion speed.

However, if the mixed-combustion rate of the highly combustible fuel increases, the risk of backfire is increased. That is, reducing the output lower limit value in the turndown operation and decreasing the risk of backfire are in a trade-off relationship.

In view of the above, an object of at least one embodiment of the present disclosure is to achieve both the reduction in the output lower limit value in the turndown operation and the decrease in the risk of backfire.

Solution to Problem (1) A gas turbine combustor according to at least one embodiment of the present disclosure, includes: a first fuel injector; a second fuel injector; a combustion part for burning fuel injected from the first fuel injector and the second fuel injector; a less combustible fuel flow control part for controlling, independently of each other, amounts of less combustible fuel supplied to the first fuel injector and the second fuel injector; a highly combustible fuel flow control part for controlling, independently of each other, amounts of highly combustible fuel having a higher combustion speed than the less combustible fuel and supplied to the first fuel injector and the second fuel injector; and a controller configured to control the less combustible fuel flow control part and the highly combustible fuel flow control part such that a relative ratio of a first ratio of the highly combustible fuel to whole of first fuel injected by the first fuel injector and a second ratio of the highly combustible fuel to whole of second fuel injected by the second fuel injector changes according to an operating condition of a gas turbine.

(2) A gas turbine according to at least one embodiment of the present disclosure, includes: the gas turbine combustor having the above configuration (1).

Advantageous Effects

According to at least one embodiment of the present disclosure, it is possible to achieve both a reduction in output lower limit value in turndown operation and a decrease in risk of backfire.

DETAILED DESCRIPTION

Figure 1:
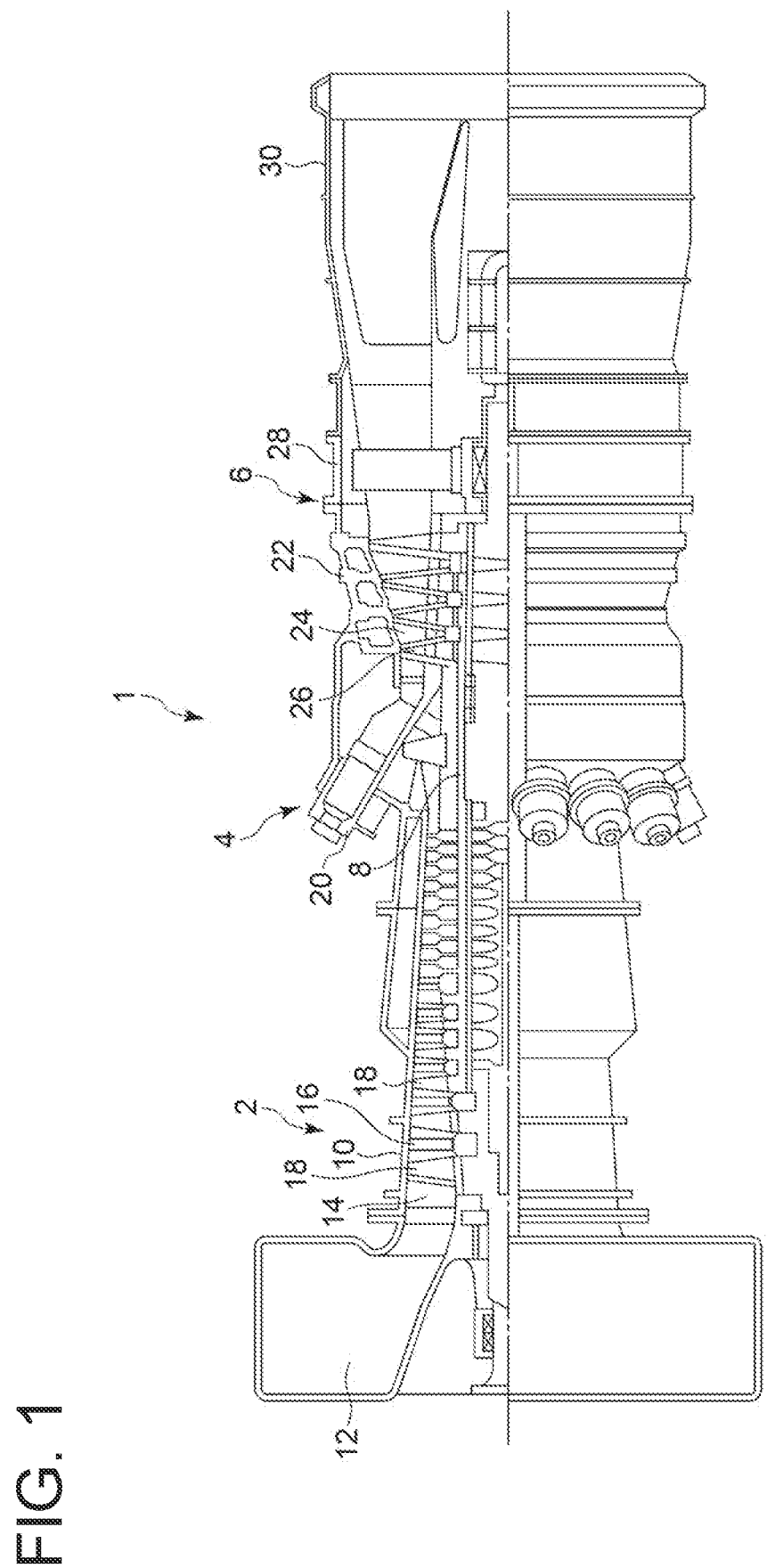
FIG. 1 is a schematic configuration view of a gas turbine according to some embodiments.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

(Regarding Gas Turbine 1)

FIG. 1 is a schematic configuration view of a gas turbine 1 according to some embodiments.

A gas turbine, which is an example of where a gas turbine combustor according to some embodiments is applied, will be described with reference to FIG. 1.

As shown in FIG. 1, the gas turbine 1 according to some embodiments includes a compressor 2 for producing compressed air serving as an oxidant, a gas turbine combustor 4 for producing a combustion gas by using the compressed air and fuel, and a turbine 6 configured to be rotary driven by the combustion gas. In the case of the gas turbine 1 for power generation, a generator (not shown) is connected to the turbine 6, generating electricity by rotational energy of the turbine 6. In the following description, the gas turbine combustor 4 is also simply referred to as the combustor 4.

The specific configuration example of each component in the gas turbine 1 according to some embodiments will be described.

The compressor 2 according to some embodiments includes a compressor casing 10, an air inlet 12 disposed on an inlet side of the compressor casing 10 and configured to suck in air, a rotor 8 disposed so as to penetrate both of the compressor casing 10 and a turbine casing 22 described later, and a variety of vanes disposed in the compressor casing 10. The variety of vanes include an inlet guide vane 14 disposed on the air inlet 12 side, a plurality of stator vanes 16 fixed to the compressor casing 10 side, and a plurality of rotor vanes 18 implanted on the rotor 8 so as to be arranged alternately with the stator vanes 16. The compressor 2 may include another constituent element such as an extraction chamber (not shown). In such compressor 2, the air sucked in from the air inlet 12 passes through the plurality of stator vanes 16 and the plurality of rotor vanes 18 and is compressed, turning into high-temperature and high-pressure compressed air. Then, the high-temperature and high-pressure compressed air is sent to the combustor 4 of a latter stage from the compressor 2.

The combustor 4 according to some embodiments is disposed in a casing 20. As shown in FIG. 1, a plurality of combustors 4 may be disposed in annular shape centered at the rotor 8 in the casing 20. The combustor 4 is supplied with fuel and the compressed air produced in the compressor 2, and burns the fuel to produce a combustion gas that serves as a working fluid for the turbine 6. Then, the combustion gas is sent to the turbine 6 at the latter stage from the combustor 4. The configuration example of the combustor 4 according to some embodiments will be described later.

The turbine 6 according to some embodiments includes a turbine casing 22 and a variety of vanes disposed in the turbine casing 22. The variety of vanes include a plurality of stator vanes 24 fixed to the turbine casing 22 side, and a plurality of rotor vanes 26 implanted on the rotor 8 so as to be arranged alternately with the stator vanes 24. The turbine 6 may include another constituent element such as an outlet guide vane. In the turbine 6, the rotor 8 is rotary driven, as the combustion gas passes through the plurality of stator vanes 24 and the plurality of rotor vanes 26. Consequently, the generator connected to the rotor 8 is driven.

An exhaust chamber 30 is connected to the downstream side of the turbine casing 22 via an exhaust casing 28. The combustion gas having driven the turbine 6 is discharged to the outside via the exhaust casing 28 and the exhaust chamber 30.

(Regarding Combustor 4)

Figure 2:
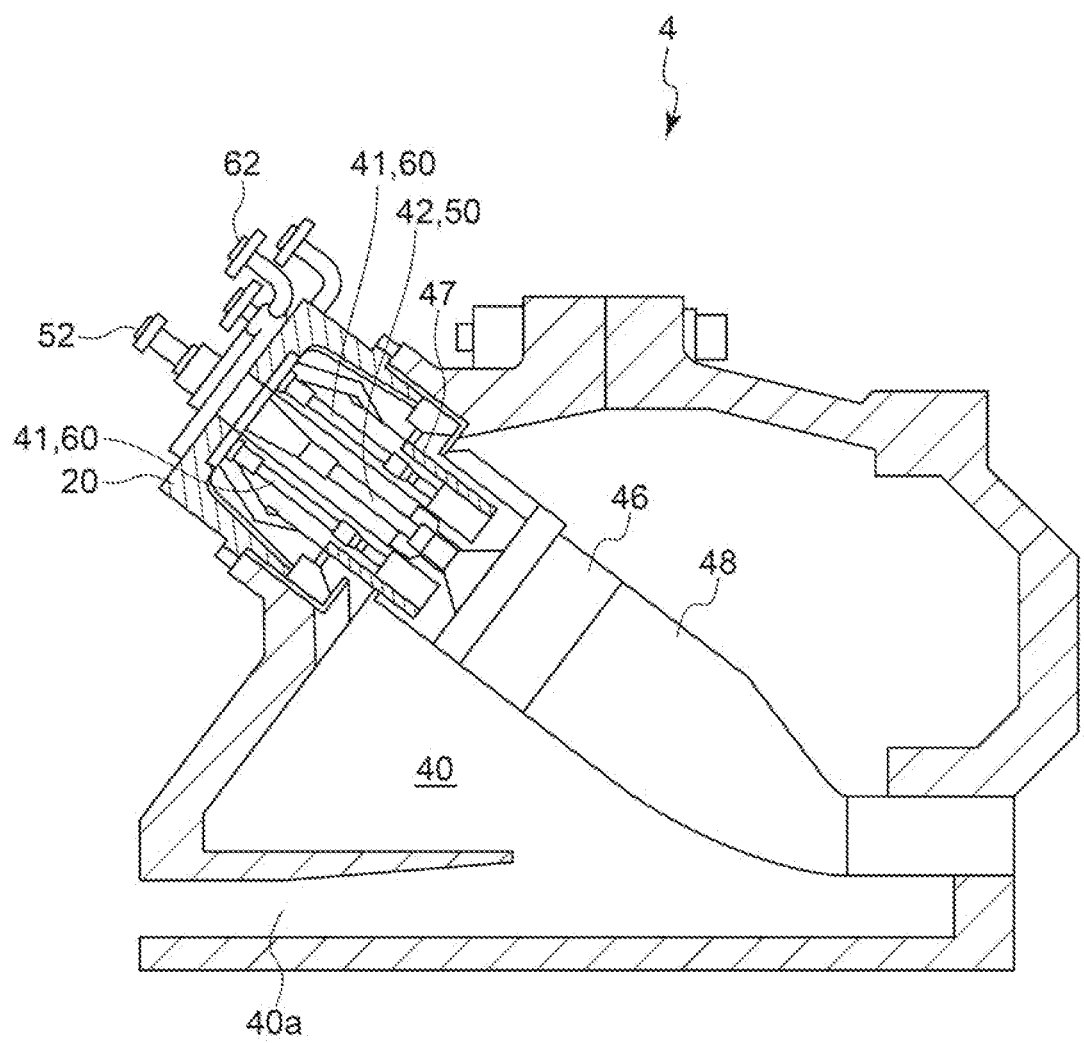
FIG. 2 is a cross-sectional view of a combustor according to some embodiments.
Figure 3:
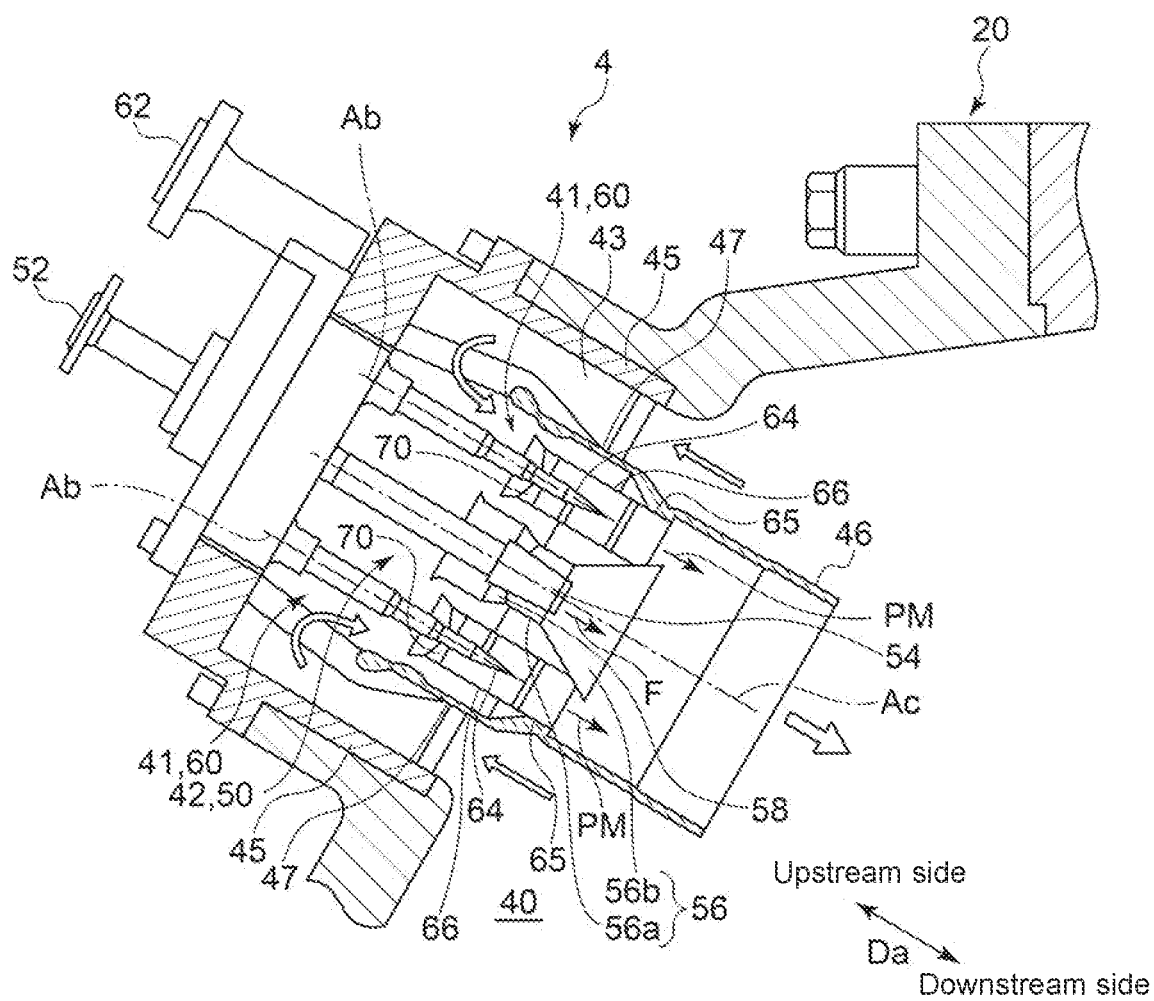
FIG. 3 is a cross-sectional view showing main parts of the combustor according to some embodiments.
Figure 4A:
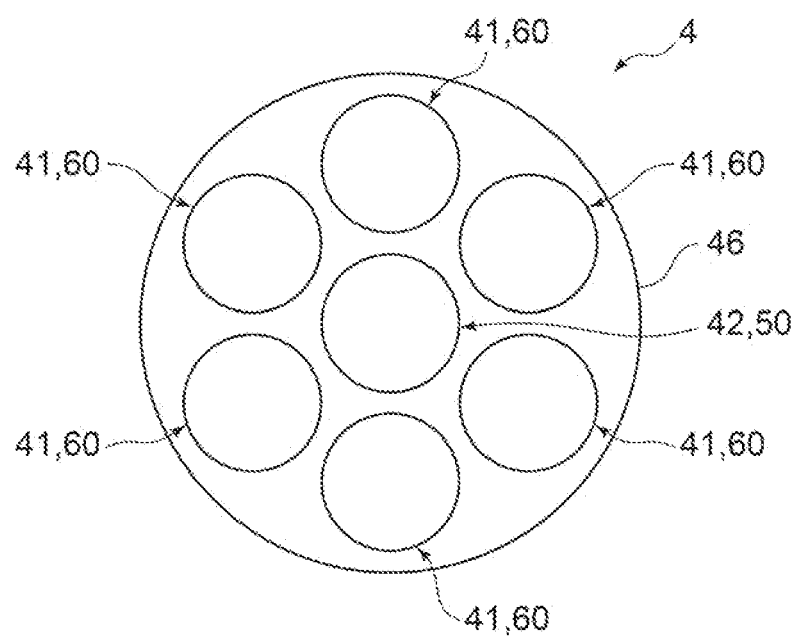
FIG. 4A is a view schematically showing the arrangement of respective fuel injectors when the combustor is viewed on an upstream side from a downstream side along the axial direction of the combustor according to some embodiments.

FIG. 2 is a cross-sectional view of the combustor 4 according to some embodiments. FIG. 3 is a cross-sectional view showing main parts of the combustor 4 according to some embodiments. FIG. 4A is a view schematically showing the arrangement of respective fuel injectors when the combustor 4 is viewed on the upstream side from the downstream side along the axial direction of the combustor 4 according to some embodiments.

The configuration of the combustor 4 according to some embodiments will be described with reference to FIGS. 2, 3, and 4A.

As shown in FIGS. 2 and 3, a plurality of combustors 4 according to some embodiments are disposed in annular shape centered at the rotor 8 (see FIG. 1). Each combustor 4 includes a combustor liner 46 disposed in a combustor casing 40 defined by the casing 20, and a first fuel injector 41 and a second fuel injector 42 disposed in the combustor liner 46. In some embodiments, the first fuel injector 41 may be a main combustion burner 60 and the second fuel injector 42 may be a pilot combustion burner 50.

In the following description, fuel F injected from the first fuel injector 41 is also referred to as first fuel F1, and the fuel F injected from the second fuel injector 42 is also referred to as second fuel F2.

The combustor 4 further includes an outer casing 45, which is disposed on an outer peripheral side of a combustor basket 47 of a combustor liner 46, in the casing 20. An air passage 43 through which compressed air flows is formed on an outer peripheral side of the combustor basket 47 and an inner peripheral side of the outer casing 45.

The combustor 4 may include another constituent element such as a bypass pipe (not shown) for allowing the combustion gas to bypass.

For example, the combustor liner 46 includes the combustor basket 47 disposed around the pilot combustion burner 50 and the plurality of main combustion burners 60, and a transition piece 48 connected to a distal end portion of the combustor basket 47. That is, the combustor liner 46 corresponds to a combustion part for burning the fuel F injected from the first fuel injector 41 and the second fuel injector 42.

As shown in FIGS. 3 and 4A, the pilot combustion burner 50 is disposed along the center axis of the combustor liner 46. Then, the plurality of main combustion burners 60 are spaced apart from each other and disposed side by side in the circumferential direction so as to surround an outer peripheral side of the pilot combustion burner 50.

As shown in FIG. 3, the pilot combustion burner 50 includes a pilot nozzle (nozzle) 54 connected to a fuel port 52, a pilot burner tube 56 disposed so as to surround the pilot nozzle 54, and a plurality of swirlers (swirl plates) 58 disposed on an outer circumference of the pilot nozzle 54.

The pilot nozzle 54 extends in an axial direction Da with a combustor axis Ac at a center.

Herein, one side in the axial direction Da, which is an extension direction of the combustor axis Ac, and is an upstream side along the flow of the combustion gas is defined as an upstream side, and another side in the axial direction Da and is a downstream side along the flow of the combustion gas is defined as a downstream side. Further, the combustor axis Ac is also a burner axis of this pilot combustion burner 50.

An injection hole (not shown) for injecting the fuel F (second fuel F2) is formed at a downstream end portion of the pilot nozzle 54. The plurality of swirl plates 58 are disposed upstream of a position where the injection hole is formed in the pilot nozzle 54. Each swirl plate 58 is configured to swirl the compressed air with the combustor axis Ac at the center. Each swirl plate 58 extends from the outer circumference of the pilot nozzle 54 in a direction including a radial direction component and is close to an inner peripheral surface of the pilot burner tube 56. The pilot burner tube 56 includes a body portion 56a located on the outer circumference of the pilot nozzle 54, and a cone portion 56b connected to the downstream side of the body portion 56a and gradually increased in diameter toward the downstream side. The plurality of swirl plates 58 are close to an inner peripheral surface of the body portion 56a of the pilot burner tube 56.

The main combustion burner 60 includes a main nozzle (nozzle) 64 connected to a fuel port 62, a main burner tube 66 disposed so as to surround the main nozzle 64, an extension pipe 65 for connecting the main burner tube 66 and the combustor liner 46 (for example, the combustor basket 47), and a swirler 70 (swirl plate) disposed on an outer circumference of the main nozzle 64.

The main nozzle 64 is a rod-shaped nozzle extending in the axial direction Da with a burner axis Ab parallel to the combustor axis Ac at the center. Since the burner axis Ab of the main combustion burner 60 is parallel to the combustor axis Ac, the axial direction Da regarding the combustor axis Ac and the axial direction Da regarding the burner axis Ab are the same direction. Further, the upstream side in the axial direction Da regarding the combustor axis Ac is the upstream side in the axial direction Da regarding the burner axis Ab, and the downstream side in the axial direction Da regarding the combustor axis Ac is the downstream side in the axial direction Da regarding the burner axis Ab.

An injection hole for injecting the fuel F (first fuel F1) is formed in an intermediate portion of the main nozzle 64 in the axial direction Da. The plurality of swirl plates 70 are disposed in the vicinity of a position where the injection hole is formed in the main nozzle 64. Each swirl plate 70 is configured to swirl the compressed air with the burner axis Ab at the center. Each swirl plate 70 extends from the outer circumference of the main nozzle 64 in a direction including a radial direction component and is close to an inner peripheral surface of the main burner tube 66. The main burner tube 66 is located on the outer circumference of the main nozzle 64.

In the combustor 4 having the above configuration, the compressed air produced in the compressor 2 is supplied into the combustor casing 40 from a casing inlet 40a, and further flows into the pilot burner tube 56 and the plurality of main burner tubes 66 from the combustor casing 40 via the air passage 43.

In the pilot combustion burner 50, the fuel F injected from the pilot nozzle 54 is ejected from a downstream end of the pilot burner tube 56 together with the compressed air. This fuel F is subjected to diffusion combustion in the combustor liner 46.

That is, the pilot combustion burner 50 (second fuel injector 42) shown in FIGS. 2, 3, and 4A is a fuel injector of a diffusion combustion type.

In the main combustion burner 60, the compressed air and the fuel F injected from the main nozzle 64 are mixed in the main burner tube 66 to form a premixed gas PM. In the main combustion burner 60, the premixed gas PM is ejected from the downstream end of the extension pipe 65. The fuel F in this premixed gas PM is subjected to premixed combustion in the combustor liner 46.

That is, the main combustion burner 60 (first fuel injector 41) shown in FIGS. 2, 3, and 4A is a fuel injector of a premixed combustion type.

An injection hole for injecting the fuel F may be formed in the swirl plate 70, and the fuel F may be injected into the main burner tube 66 from the injection hole. In this case, a portion corresponding to the rod-shaped main nozzle 64 described above constitutes a hub rod, and the main nozzle is formed to include the hub rod and the plurality of swirl plates 70. The fuel F from the outside is supplied into the hub rod, and the fuel F is supplied to the swirl plates 70 from the hub rod.

Figure 4B:
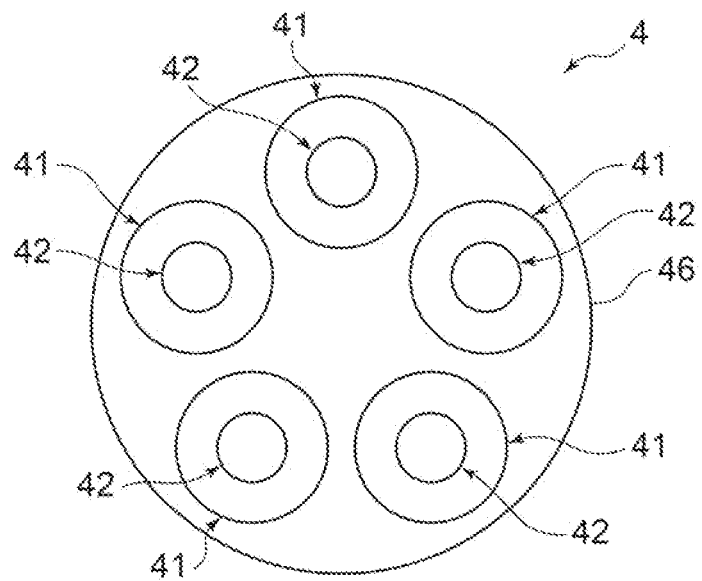
FIG. 4B is a view schematically showing the arrangement of the respective fuel injectors when the combustor is viewed on the upstream side from the downstream side along the axial direction of the combustor according to another embodiment.

FIG. 4B is a view schematically showing the arrangement of the respective fuel injectors 41, 42 when the combustor 4 is viewed on the upstream side from the downstream side along the axial direction of the combustor 4 according to another embodiment. In the combustor 4 shown in FIG. 4B, the first fuel injector 41 is arranged coaxially with the second fuel injector 42. The combustor 4 shown in FIG. 4B is configured to inject the first fuel F1 from a periphery of the second fuel injector 42.

In the combustor 4 shown in FIG. 4B, the first fuel injector 41 and the second fuel injector 42 are arranged side by side in the circumferential direction inside the combustor basket 47. In the combustor 4 shown in FIG. 4B, both the first fuel injector 41 and the second fuel injector 42 may be the fuel injectors of the premixed combustion type.

(Regarding Fuel F)

For example, in a gas turbine for power generation, an operating condition may be switched to turndown operation in order to cope with a fluctuation in power demand during the day or at night. In the turndown operation, the gas turbine is operated at a low output relative to during rated operation by reducing the flow rate of a combustion gas passing through a turbine.

If the output is reduced by performing the turndown operation of the gas turbine, a combustion temperature in a combustor decreases, resulting in an increase in generation of an unburned substance such as carbon monoxide or hydrocarbon, or occurrence of a combustion vibration. However, in order to flexibly cope with the above-described fluctuation in power demand, it is required to widen an operating range of the gas turbine by reducing an output lower limit value in the turndown operation.

In order to reduce the output lower limit value in the turndown operation, it is desirable to perform mixed-combustion of highly combustible fuel, such as hydrogen, having a relatively high combustion speed.

Therefore, the combustor 4 according to some embodiments is configured such that, for example, a natural gas can be used as the fuel F as in the conventional combustor and, for example, any of hydrogen, propane, or a mixture of hydrogen and propane can be used as highly combustible fuel FH. In the following description, a case where hydrogen is used as the highly combustible fuel will be described as an example. Further, in the following description, the natural gas, which is the fuel F conventionally used, is also referred to as less combustible fuel FL. That is, the highly combustible fuel FH is fuel having a higher combustion speed than the less combustible fuel FL. The combustion speed of the fuel F referred to here is, for example, a combustion speed of an air-fuel mixture in which the fuel F and air are mixed such that the equivalence ratio is 1 in standard conditions (0° C., 1,013 hPa).

By using, for example, the natural gas as the less combustible fuel FL and using, for example, any of hydrogen, propane, or the mixture of hydrogen and propane as the highly combustible fuel FH, it is possible to suppress an increase in cost of the fuel F.

(Regarding Supply System for Fuel F)

Figure 5:
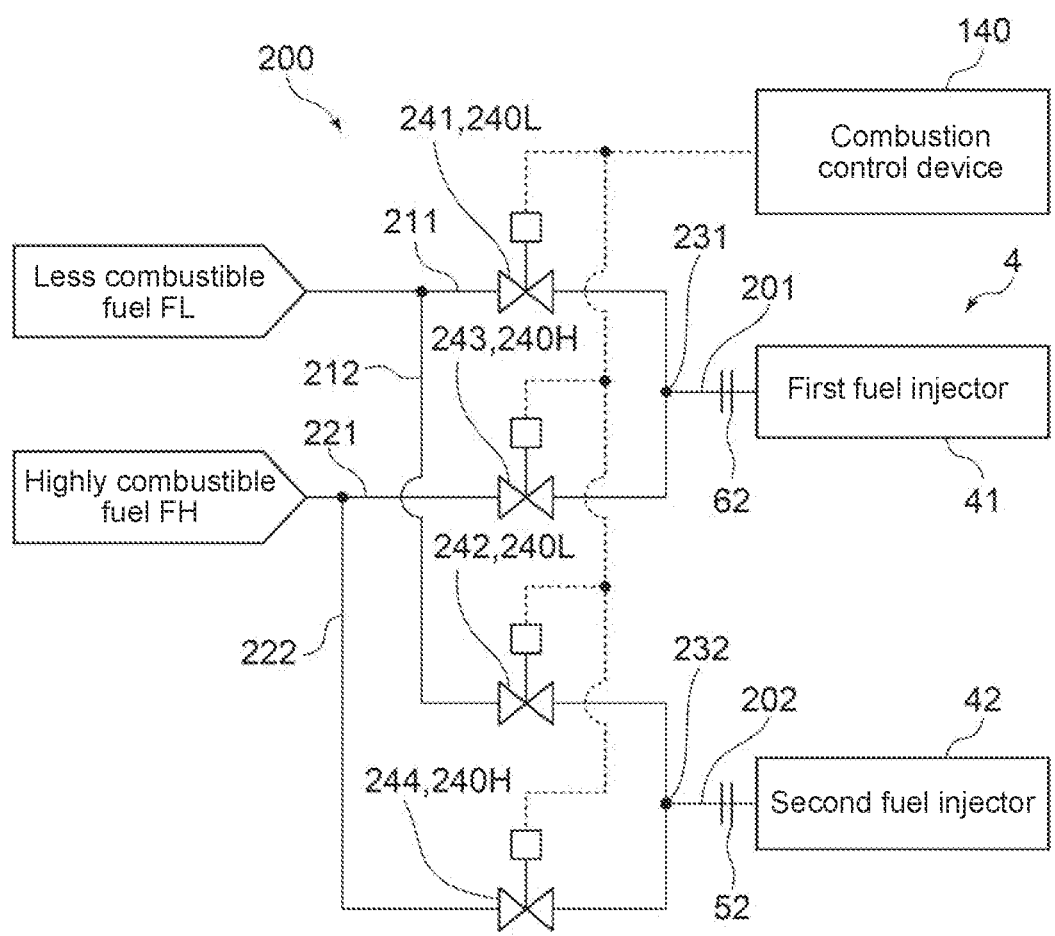
FIG. 5 is a schematic diagram of a supply system for fuel with respect to the combustor according to some embodiments.

FIG. 5 is a schematic diagram of a supply system 200 for the fuel F with respect to the combustor 4 according to some embodiments. The gas turbine 1 according to some embodiments includes the supply system 200 for the fuel F shown in FIG. 5. The supply system 200 for the fuel F shown in FIG. 5 includes an L1 supply line 211 for supplying the less combustible fuel FL to the first fuel injector 41, an L2 supply line 212 for supplying the less combustible fuel FL to the second fuel injector 42, an H1 supply line 221 for supplying the highly combustible fuel FH to the first fuel injector 41, and an H2 supply line 222 for supplying the highly combustible fuel FH to the second fuel injector 42.

The L1 supply line 211 joins the H1 supply line 221 at a confluent portion 231. A fuel supply line after the confluent portion 231 is referred to as a first fuel supply line 201. The first fuel supply line 201 is connected to the fuel port 62 to which the main nozzle 64 of the main combustion burner 60 (first fuel injector 41) is connected.

The L2 supply line 212 joins the H2 supply line 222 at a confluent portion 232. A fuel supply line after the confluent portion 232 is referred to as a second fuel supply line 202. The second fuel supply line 202 is connected to the fuel port 52 to which the pilot nozzle 44 of the pilot combustion burner 50 (second fuel injector 42) is connected.

The L1 supply line 211 is provided with an L1 flow control part 241 for controlling the amount of the less combustible fuel FL supplied to the first fuel injector 41. The L2 supply line 212 is provided with an L2 flow control part 242 for controlling the amount of the less combustible fuel FL supplied to the second fuel injector 42.

The H1 supply line 221 is provided with an H1 flow control part 243 for controlling the amount of the highly combustible fuel FH supplied to the first fuel injector 41. The H2 supply line 222 is provided with an H2 flow control part 244 for controlling the amount of the highly combustible fuel FH supplied to the second fuel injector 42.

The L1 flow control part 241, the L2 flow control part 242, the H1 flow control part 243, and the H2 flow control part 244 are, for example, flow control valves.

In the supply system 200 for the fuel F shown in FIG. 5, the less combustible fuel flow control part 240L for controlling, independently of each other, amounts of the less combustible fuel FL supplied to the first fuel injector 41 and the second fuel injector 42 includes the L1 flow control part 241 and the L2 flow control part 242. In the supply system 200 for the fuel F shown in FIG. 5, a highly combustible fuel flow control part 240H for controlling, independently of each other, amounts of the highly combustible fuel FH supplied to the first fuel injector 41 and the second fuel injector 42 includes the H1 flow control part 243 and the H2 flow control part 244.

The L1 flow control part 241, the L2 flow control part 242, the H1 flow control part 243, and the H2 flow control part 244 are controlled by a controller configured to control the less combustible fuel flow control part 240L and the highly combustible fuel flow control part 240H. In some embodiments, the controller is implemented by a combustion control device 140 for the gas turbine 1.

That is, in some embodiments, the combustion control device 140 is configured to control a first ratio R1 of the highly combustible fuel FH to whole of the first fuel F1 injected by the first fuel injector 41 and a second ratio R2 of the highly combustible fuel FH to whole of the second fuel F2 injected by the second fuel injector 42. Details of the combustion control device 140 will be described later.

In the combustor 4 according to some embodiments, since it is possible to perform mixed-combustion of the highly combustible fuel FH, such as hydrogen, having the relatively high combustion speed, it is possible to reduce the output lower limit value in the turndown operation of the gas turbine 1.

However, if the mixed-combustion rate of the highly combustible fuel FH, that is, the first ratio R1 and the second ratio R2 are increased, the risk of backfire is increased. That is, reducing the output lower limit value in the turndown operation and decreasing the risk of backfire are in a trade-off relationship.

Meanwhile, since the risk of backfire varies depending on, for example, a structure of the fuel injector or an arrangement position of the fuel injector, it is not always true that any and every fuel injector among the plurality of fuel injectors has the same risk of backfire. More specifically, for example, it is as follows.

In the embodiments shown in FIGS. 2, 3, and 4A, the first fuel injector 41 is the fuel injector of the premixed combustion type and the second fuel injector 42 is the fuel injector of the diffusion combustion type.

In general, the fuel injector of the diffusion combustion type is a combustor having the lower risk of backfire than the fuel injector of the premixed combustion type. Therefore, in the embodiments shown in FIGS. 2, 3, and 4A, the second fuel injector 42 is the combustor having the lower risk of backfire than the first fuel injector 41.

In general, if a fuel injector is surrounded by a plurality of other fuel injectors, the surrounded fuel injector has the lower risk of backfire than the surrounding fuel injectors.

Herein, in the embodiments shown in FIGS. 2, 3, and 4A, a plurality of the first fuel injectors 41 are disposed around a periphery of the second fuel injector 42. Therefore, if the first fuel injector 41 and the second fuel injector 42 have the similar fuel injector structures as in the case where both the first fuel injector 41 and the second fuel injector 42 are the fuel injectors of the diffusion combustion type or the premixed combustion type in the embodiments shown in FIGS. 2, 3, and 4A, the second fuel injector is the combustor having the lower risk of backfire than the first fuel injector.

Further, in the embodiment shown in FIG. 4B, the first fuel injector 41 is disposed coaxially with the second fuel injector 42 and configured to inject the first fuel F1 from the periphery of the second fuel injector 42.

In general, if respective fuel injectors are configured such that one fuel injector is disposed coaxially with another fuel injector and the one fuel injector injects fuel from the periphery of the another fuel injector, the another fuel injector has the lower risk of backfire than the one fuel injector.

Therefore, if the first fuel injector 41 and the second fuel injector 42 have the similar fuel injector structures as in the case where both the first fuel injector 41 and the second fuel injector 42 are the fuel injectors of the diffusion combustion type or the premixed combustion type in the embodiment shown in FIG. 4B, the second fuel injector 42 is the combustor having the lower risk of backfire than the first fuel injector 41.

Therefore, in the combustor 4 according to some embodiments, both the reduction in the output lower limit value in the turndown operation and the decrease in the risk of backfire are to be achieved by changing a relative ratio R of the first ratio R1 and the second ratio R2 in consideration of the above.

That is, in the combustor 4 according to some embodiments, the combustion control device 140 is configured to control the less combustible fuel flow control part 240L and the highly combustible fuel flow control part 240H such that the relative ratio R of the first ratio R1 and the second ratio R2 changes according to the operating condition of the gas turbine 1.

With the combustor 4 according to some embodiments, both the reduction in the output lower limit value in the turndown operation and the decrease in the risk of backfire can be achieved by changing the relative ratio R according to the operating condition of the gas turbine 1.

In the gas turbine 1 including the combustor 4 according to some embodiments, it is possible to achieve both the reduction in the output lower limit value in the turndown operation and the decrease in the risk of backfire, and it is possible to widen an operating range of the gas turbine 1.

Hereinafter, the change in the relative ratio R according to the operating condition of the gas turbine 1 will be described in detail.

In general, the supply amount of the fuel F increases as the load on the gas turbine 1 increases, increasing the risk of backfire. Therefore, in order to avoid backfire, it is desirable that the ratio of the highly combustible fuel FH to the whole of the fuel F injected by the fuel injector is reduced as the load on the gas turbine 1 increases. However, as described above, since the risk of backfire varies depending on, for example, the structure of the fuel injector or the arrangement position of the fuel injector, it is not always true that any and every fuel injector among the plurality of fuel injectors has the same risk of backfire. Therefore, if the first fuel injector 41 is the combustor having the higher risk of backfire than the second fuel injector 42 as described above, it is desirable that the degree of the reduction in the first ratio R1 is higher than the degree of the reduction in the second ratio R2 as the load on the gas turbine increases. That is, it is desirable that the value obtained by dividing the first ratio R1 by the second ratio R2 decreases as the load on the gas turbine 1 increases (the value obtained by dividing the first ratio R1 by the second ratio R2 increases as the load on the gas turbine 1 decreases).

In the following description, the description will be given by assuming that the relative ratio R is a value obtained by dividing the first ratio R1 by the second ratio R2 (R=R1/R2).

Figure 6A:
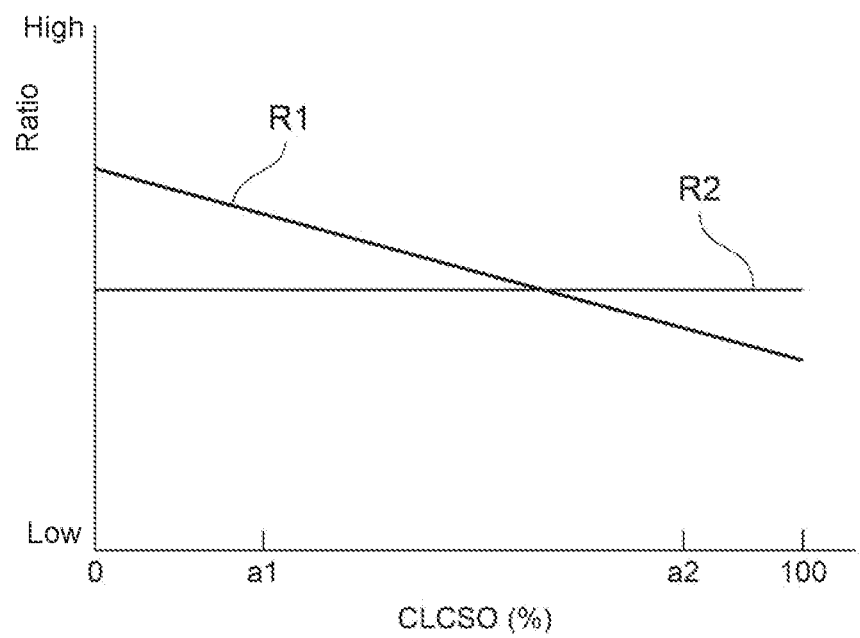
FIG. 6A is a graph showing an example of a relationship between an index representing an operating condition of the gas turbine, and a first ratio and a second ratio.

FIG. 6A is a graph showing an example of a relationship between an index representing the operating condition of the gas turbine 1, and the first ratio R1 and the second ratio R2.

Figure 6B:
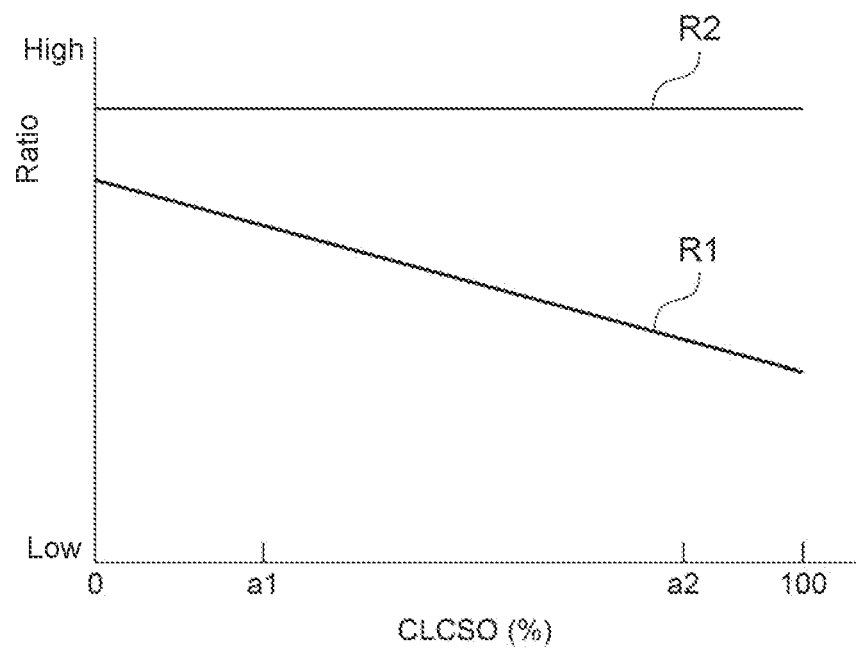
FIG. 6B is a graph showing another example of a relationship between the index representing the operating condition of the gas turbine, and the first ratio and the second ratio.

FIG. 6B is a graph showing another example of a relationship between the index representing the operating condition of the gas turbine 1, and the first ratio R1 and the second ratio R2.

Figure 6C:
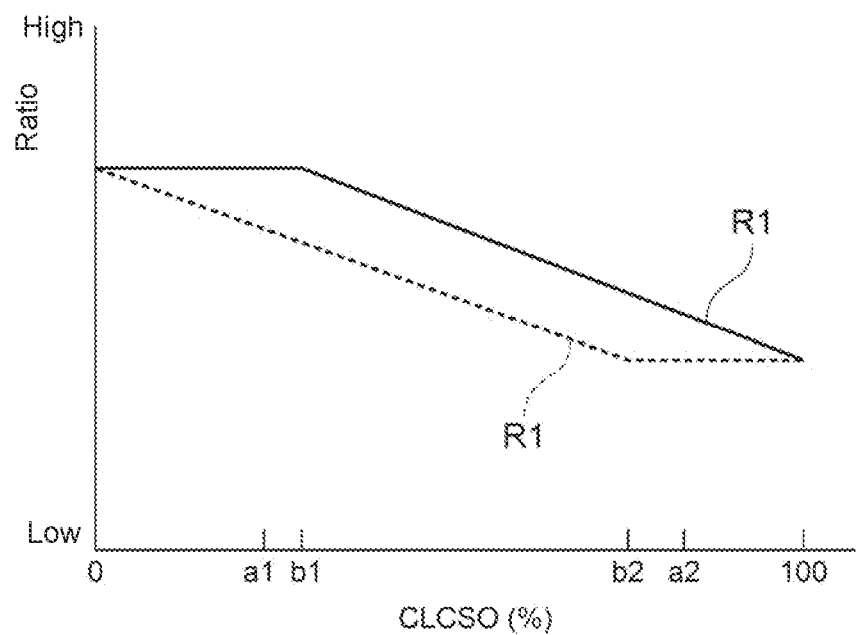
FIG. 6C is a graph showing another example of a relationship between the first ratio and the index representing the operating condition of the gas turbine.
Figure 6D:
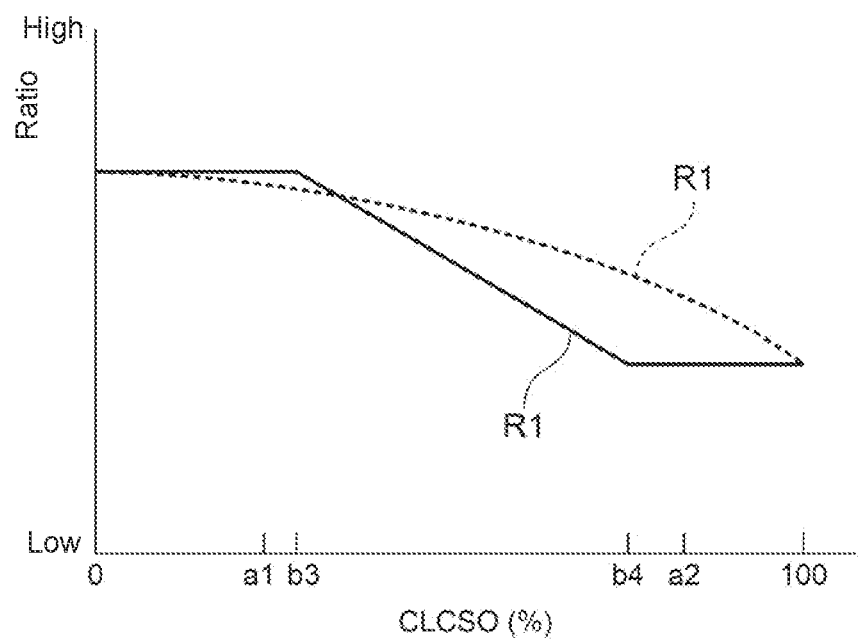
FIG. 6D is a graph showing another example of a relationship between the first ratio and the index representing the operating condition of the gas turbine.

FIGS. 6C and 6D are each a graph showing another example of a relationship between the first ratio R1 and the index representing the operating condition of the gas turbine 1.

Figure 6E:
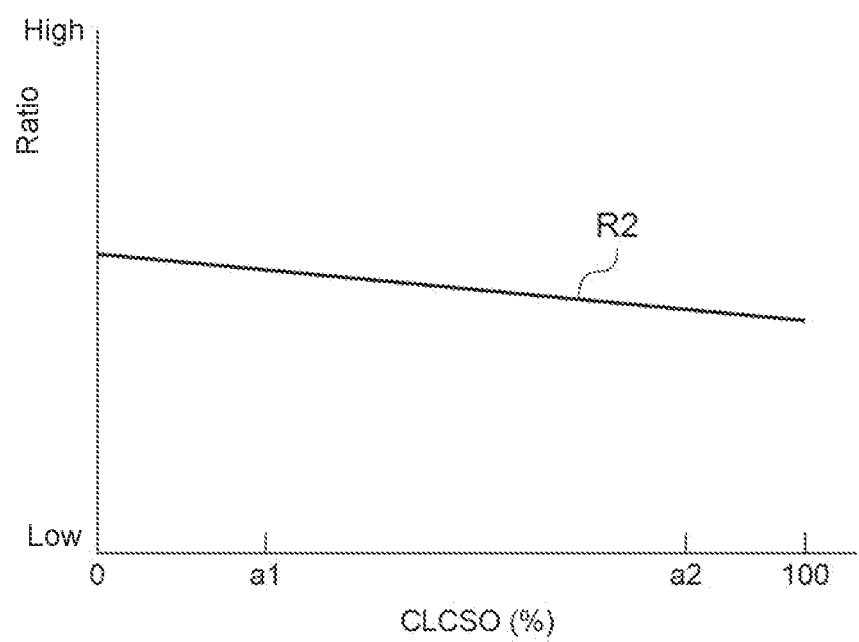
FIG. 6E is a graph showing another example of a relationship between the second ratio and the index representing the operating condition of the gas turbine.

FIG. 6E is a graph showing another example of a relationship between the second ratio R2 and the index representing the operating condition of the gas turbine 1.

In FIGS. 6A to 6E, as the index representing the operating condition of the gas turbine 1, for example, a gas turbine inlet combustion gas temperature T1T, a combustion load command value (CLCSO) which is a dimensionless value of the gas turbine inlet combustion gas temperature T1T, or a load on the gas turbine 1 (generator output: gas turbine output) can be given. The gas turbine inlet combustion gas temperature T1T is a temperature of the combustion gas at an inlet of the turbine 6. The CLCSO will be described in detail later. Further, the load on the gas turbine 1 may be an actual measurement value of the generator output, or may be a generator output command value transmitted from a central power supply center (not shown) for controlling the generator output of a plurality of power generation facilities.

That is, in some embodiments, the above-described index is preferably the gas turbine inlet combustion gas temperature T1T.

In general, the gas turbine inlet combustion gas temperature T1T is an index indicating the operating condition of the gas turbine 1 more accurately than, for example, the load on the gas turbine 1. If the above-described index is the gas turbine inlet combustion gas temperature T1T, the operating condition of the gas turbine 1 can more accurately be reflected in the relative ratio R, making it possible to improve the control accuracy of the above-described relative ratio R.

In some embodiments, the above-described index may be the dimensionless value (CLCSO) of the gas turbine inlet combustion gas temperature T1T.

As described above, the gas turbine inlet combustion gas temperature T1T is the index indicating the operating condition of the gas turbine 1 more accurately than, for example, the load on the gas turbine 1. However, in the gas turbine 1 of recent years, the gas turbine inlet combustion gas temperature T1T has increased, making it difficult to measure the gas turbine inlet combustion gas temperature T1T for a long period of time.

If the above-described index is the CLCSO, it is not necessary to measure the gas turbine inlet combustion gas temperature T1T for the long period of time, making it possible to easily improve the control accuracy of the above-described relative ratio R.

In some embodiments, the above-described index may be the load on the gas turbine 1.

The load on the gas turbine 1 is less accurate as the index representing the operating condition of the gas turbine 1 than, for example, the gas turbine inlet combustion gas temperature T1T, but the value of the load on the gas turbine 1 can easily be acquired.

If the above-described index is the load on the gas turbine 1, it is possible to simplify the configuration for controlling the above-described relative ratio R.

In the following description, a case where the index representing the operating condition of the gas turbine 1 is the CLCSO will be described as an example. However, the relationship between the CLCSO, and the first ratio R1 and the second ratio R2 described below also applies to each index described above other than the CLCSO.

As described above, in general, the supply amount of the fuel F increases as the load on the gas turbine 1 increases, increasing the risk of backfire. Therefore, for example, as shown in FIGS. 6A to 6D, the first ratio R1 preferably tends to decrease as the CLCSO increases.

The lower limit value of the first ratio R1 may be zero.

As described above, since the second fuel injector 42 is the combustor having the lower risk of backfire than the first fuel injector 41, for example, as shown in FIGS. 6A and 6B, the second ratio R2 may be a constant value regardless of the magnitude of the CLCSO. For example, as shown in FIG. 6E, the second ratio R2 may tend to decrease as the CLCSO increases. In this case, an absolute value of the rate of change of the second ratio R2 to the change in CLCSO may be smaller than an absolute value of the rate of change of the first ratio R1 to the change in CLCSO. That is, the decrease rate of the second ratio R2 when the CLCSO increases may be lower than the decrease rate of the first ratio R1 when the CLCSO increases.

As described above, since the second fuel injector 42 is the combustor having the lower risk of backfire than the first fuel injector 41, for example, as shown in FIGS. 6A and 6B, the second ratio R2 may be higher than the first ratio R1 at least in a region where the CLCSO is relatively large, and as shown in FIG. 6B, the second ratio R2 may be higher than the first ratio R1 regardless of the magnitude of the CLCSO.

As shown in FIGS. 6C and 6D, if the CLCSO is a value within a certain range, the first ratio R1 may be a constant value regardless of the magnitude of the CLCSO. For example, as shown by a solid graph line in FIG. 6C, in a region where the CLCSO is a relatively small value (for example, at least 0% and at most b1%), the first ratio R1 may be a constant value regardless of the magnitude of the CLCSO. For example, as shown by a solid graph line in FIG. 6D, in a region where the CLCSO is a relatively small value (for example, at least 0% and at most b3%), the first ratio R1 may be a constant value regardless of the magnitude of the CLCSO.

Further, for example, as shown by a dashed graph line in FIG. 6C, in a region where the CLCSO is a relatively large value (for example, at least b2% and at most 100%), the first ratio R1 may be a constant value regardless of the magnitude of the CLCSO. For example, as shown by a solid graph line in FIG. 6D, in a region where the CLCSO is a relatively large value (for example, at least b4% and at most 100%), the first ratio R1 may be a constant value regardless of the magnitude of the CLCSO.

Note that b1<b2 in FIG. 6C, and b3<b4 in FIG. 6D.

Although not shown, in FIG. 6C, the first ratio R1 may be a constant value regardless of the magnitude of the CLCSO in at least a partial region within the range where the magnitude of the CLCSO is at least b1% and at most b2%. Likewise, in FIG. 6D, the first ratio R1 may be a constant value regardless of the magnitude of the CLCSO in at least a partial region within the range where the magnitude of the CLCSO is at least b3% and at most b4%.

Further, although not shown, in FIG. 6A or 6B, a part of the graph line may have a portion where the first ratio R1 is a constant value regardless of the magnitude of the CLCSO.

The graph line of the first ratio R1 may be represented by a straight line, such as the graph lines shown in FIGS. 6A to 6C and the solid graph line shown in FIG. 6D, may be represented by a curved line, such as the dashed graph line shown in FIG. 6D, or may be represented by, for example, the straight line and the curved line.

If the second ratio R2 is higher than the first ratio R1 at least in a region where the CLCSO is relatively large, the second ratio R2 may change relative to the change in the CLCSO as with the tendency of the above-described change in the first ratio R1 relative to the change in the CLCSO.

In view of the foregoing, the change tendencies of the first ratio R1 and the second ratio R2 relative to the change in the CLCSO can be summarized as follows.

In the combustor 4 according to some embodiments, in the first fuel injector 41 and the second fuel injector 42, the relative ratio R is preferably set such that the value obtained by dividing the first ratio R1 by the second ratio R2 (that is, the relative ratio R=R1/R2) is larger in a case where the index (such as the CLCSO) representing the operating condition is a first value a1 (see FIGS. 6A and 6B) than in a case where the index is a second value a2 (see FIGS. 6A and 6B) at which a load on the gas turbine 1 is high relative to the case where the index is the first value a1.

For example, as shown in FIGS. 6A to 6D, the first ratio R1 tends to decrease as the CLCSO increases, and as shown in FIGS. 6A and 6B, if the second ratio R2 is a constant value regardless of the magnitude of the CLCSO, the value obtained by dividing the first ratio R1 by the second ratio R2 is larger in the case where the CLCSO is the first value a1 than in the case where the CLCSO is the second value a2. For example, as shown in FIG. 6E, even if the second ratio R2 tends to decrease as the CLCSO increases, the value obtained by dividing the first ratio R1 by the second ratio R2 is preferably larger in the case where the CLCSO is the first value a1 than in the case where the CLCSO is the second value a2.

Therefore, since the first fuel injector 41 is the combustor having the higher risk of backfire than the second fuel injector 42, the above-described relative ratio R is desirable in order to achieve both the reduction in the output lower limit value in the turndown operation and the decrease in the risk of backfire.

In the combustor 4 according to some embodiments, the controller, that is, the combustion control device 140 may be configured to control the less combustible fuel flow control part 240L and the highly combustible fuel flow control part 240H such that at least either of the first ratio R1 or the second ratio R2 is different between the case where the above-described index (such as the CLCSO) is the first value a1 and the case where the above-described index is the second value a2.

That is, since at least either of the first ratio R1 or the second ratio R2 is different between the case where the above-described index (such as the CLCSO) is the first value a1 and the case where the above-described index is the second value a2, the above-described relative ratio R can be different between the case where the above-described index is the first value a1 and the case where the above-described index is the second value a2.

In the combustor 4 according to some embodiments, the controller, that is, the combustion control device 140 may be configured to control the less combustible fuel flow control part 240L and the highly combustible fuel flow control part 240H such that the first ratio R1 is lower in the case where the above-described index (such as the CLCSO) is the second value a2 than in the case where the above-described index is the first value a1.

Consequently, even if the load on the gas turbine 1 becomes relatively large, it is possible to suppress the risk of backfire in the first fuel injector 41 having the higher risk of backfire than the second fuel injector 42.

In the combustor 4 according to some embodiments, the controller, that is, the combustion control device 140 may be configured to control the less combustible fuel flow control part 240L and the highly combustible fuel flow control part 240H such that the second ratio R2 is not lower than the first ratio R1 in the case where the above-described index (such as the CLCSO) is the second value a2.

Therefore, since the first fuel injector 41 is the combustor having the higher risk of backfire than the second fuel injector 42, it is possible to make the second ratio R2 in the second fuel injector 42 relatively high while suppressing the risk of backfire in the first fuel injector 41 when the load on the gas turbine 1 becomes relatively large. For example, if the highly combustible fuel FH is fuel, such as hydrogen, having a relatively small environmental load, the environmental load can be suppressed by making the second ratio R2 relatively high.

In the combustor 4 according to some embodiments, the controller, that is, the combustion control device 140, may be configured to control the less combustible fuel flow control part 240L and the highly combustible fuel flow control part 240H such that the second ratio R2 is at least 0.5 in the case where the above-described index (such as the CLCSO) is the second value a2.

Thus, it is possible to make the second ratio R2 in the second fuel injector 42 relatively high when the load on the gas turbine 1 becomes relatively large. For example, if the highly combustible fuel FH is fuel, such as hydrogen, having a relatively small environmental load, the environmental load can be suppressed by making the second ratio R2 relatively high.

(Regarding Combustion Control Device 140)

Figure 7:
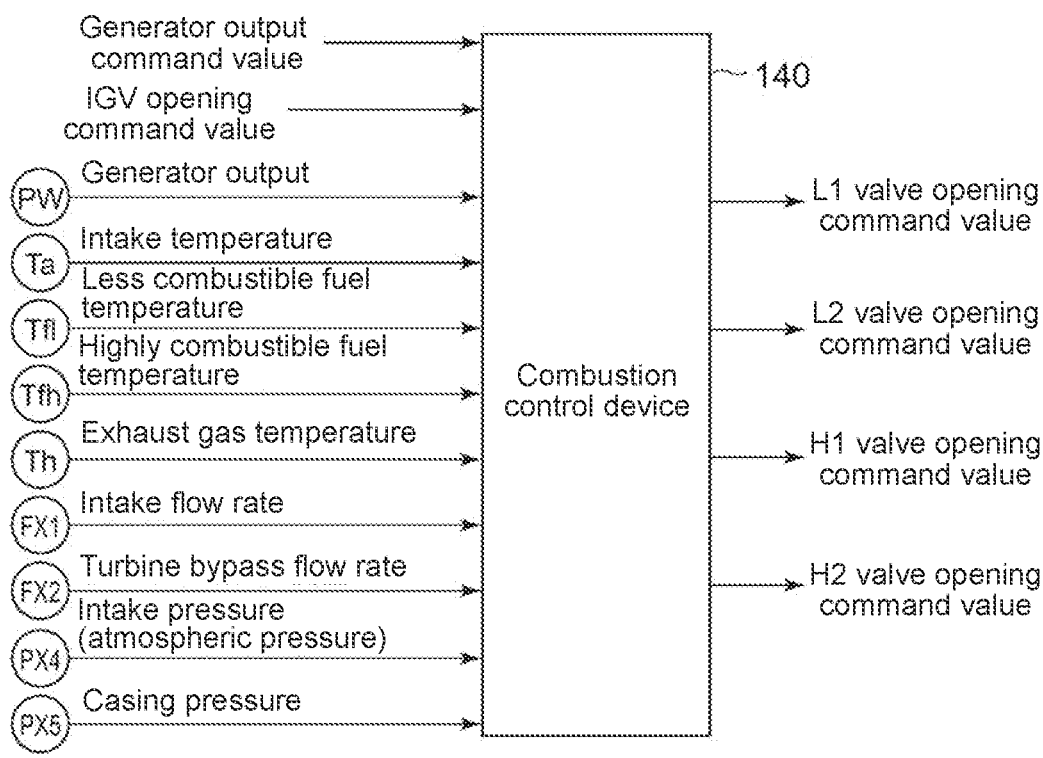
FIG. 7 is an overall schematic diagram of a combustion control device according to some embodiments.

FIG. 7 is an overall schematic diagram of the combustion control device 140 according to some embodiments.

The combustion control device 140 according to some embodiments will be described with reference to FIG. 7. Each processing function of the combustion control device 140 is configured by software (computer program) and executed by a computer. However, the present disclosure is not limited thereto and each processing function of the combustion control device 140 may be configured by hardware.

As shown in FIG. 7, the combustion control device 140 according to some embodiments receives a generator output command value transmitted from the central power supply center (not shown) and an IGV opening command value transmitted from an IGV control device (not shown). The generator output command value is not limited to being transmitted from the central power supply center, but may be set by a generator output setting device provided in a gas turbine power generation facility, for example. Further, herein, the IGV opening command value is adopted as an IGV opening used to calculate the CLCSO, but the present disclosure is not necessarily limited to thereto and a measurement value of the IGV opening may be used if the IGV opening is measured, for example.

Further, the combustion control device 140 according to some embodiments receives a generator output measured by a power meter PW as the actual measurement value as described above, an intake temperature measured by an intake thermometer Ta, a less combustible fuel temperature measured by a less combustible fuel gas thermometer Tfl, a highly combustible fuel temperature measured by a highly combustible fuel gas thermometer Tfh, an exhaust gas temperature measured by an exhaust gas thermometer Th, an intake flow rate measured by an intake flow meter FX1, a turbine bypass flow rate measured by a turbine bypass flow meter FX2, an intake pressure measured by an intake pressure gauge PX4, and a casing pressure measured by a casing pressure gauge PX5.

The turbine bypass flow rate is the flow rate of compressed air flowing through a turbine bypass line (not shown) without passing through the combustor 4 and the turbine 6.

The turbine bypass line (not shown) is provided with a turbine bypass valve (not shown) for controlling the turbine bypass flow rate of the compressed air. This is provided for regulating an outlet pressure (casing pressure) of the compressor 2.

Then, the combustion control device 140 according to some embodiments obtains, based on these input signals, an L1 valve opening command value for controlling the amount of the less combustible fuel FL supplied to the first fuel injector 41, an L2 valve opening command value for controlling the amount of the less combustible fuel FL supplied to the second fuel injector 42, an H1 valve opening command value for controlling the amount of the highly combustible fuel FH supplied to the first fuel injector 41, and an H2 valve opening command value for controlling the amount of the highly combustible fuel FH supplied to the second fuel injector 42.

The L1 valve opening command value is a command value for a valve opening in the L1 flow control part 241, and the L2 valve opening command value is a command value for a valve opening in the L2 flow control part 242. The H1 valve opening command value is a command value for a valve opening in the H1 flow control part 243, and the H2 valve opening command value is a command value for a valve opening in the H2 flow control part 244.

The L1 valve opening command value, the L2 valve opening command value, the H1 valve opening command value, and the H2 valve opening command value are calculated such that the CLCSO, and the first ratio R1 and the second ratio R2 are in the above-described relationship.

In the combustor 4 according to some embodiments, the valve opening in the L1 flow control part 241 is set to the valve opening corresponding to the L1 valve opening command value, thereby controlling the amount of the less combustible fuel FL supplied to the first fuel injector 41. Further, in the combustor 4 according to some embodiments, the valve opening in the H1 flow control part 243 is set to the valve opening corresponding to the H1 valve opening command value, thereby controlling the amount of the highly combustible fuel FH supplied to the first fuel injector 41.

Consequently, the less combustible fuel FL and the highly combustible fuel FH are supplied to the first fuel injector 41 at the first ratio R1 calculated and set by the combustion control device 140.

In the combustor 4 according to some embodiments, the valve opening in the L2 flow control part 242 is set to the valve opening corresponding to the L2 valve opening command value, thereby controlling the amount of the less combustible fuel FL supplied to the second fuel injector 42. Further, in the combustor 4 according to some embodiments, the valve opening in the H2 flow control part 244 is set to the valve opening corresponding to the H2 valve opening command value, thereby controlling the amount of the highly combustible fuel FH supplied to the second fuel injector 42.

Consequently, the less combustible fuel FL and the highly combustible fuel FH are supplied to the second fuel injector 42 at the second ratio R2 calculated and set by the combustion control device 140.

(Regarding CLCSO)

Figure 8:
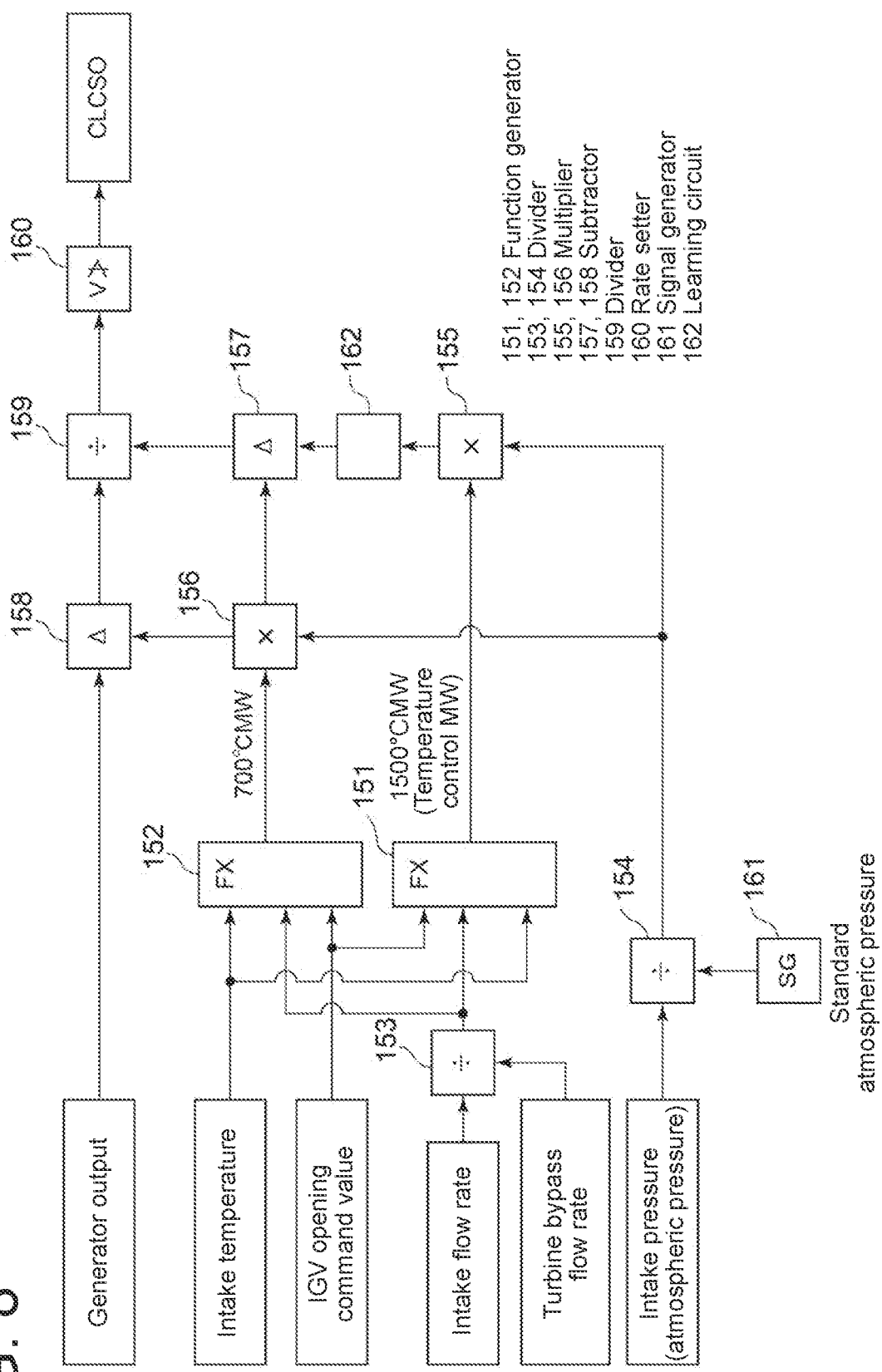
FIG. 8 is a block diagram showing the configuration of a CLCSO calculation logic in the combustion control device according to some embodiments.

FIG. 8 is a block diagram showing the configuration of a CLCSO calculation logic in the combustion control device 140 according to some embodiments.

The combustion load command value (CLCSO) is a dimensionless parameter of the gas turbine inlet combustion gas temperature T1T, and is a parameter having a positive correlation with the gas turbine inlet combustion gas temperature T1T (proportional to the gas turbine inlet combustion gas temperature T1T). The CLCSO is set at 0% when the gas turbine inlet combustion gas temperature T1T has a lower limit value, and set at 100% when the gas turbine inlet combustion gas temperature T1T has an upper limit value. For example, when the lower limit value of the gas turbine inlet combustion gas temperature T1T is 700° C. and the upper limit value of the gas turbine inlet combustion gas temperature T1T is 1,500° C., the CLCSO is represented by:

$$\text{CLCSO (\%)} = \{(\text{actual output} - 700° \text{C. MW})/(1{,}500° \text{C. MW} - 700° \text{C. MW})\} \times 100 \quad (1)$$

The actual output is the gas turbine output (generator output) of the actual measurement value. 700° C. MW is the output of the gas turbine 1 (generator output) when the gas turbine inlet combustion gas temperature T1T is 700° C. which is the lower limit value, in a current environment in which the gas turbine 1 is placed. Further, 1,500° C. MW is the output of the gas turbine 1 (generator output) when the gas turbine inlet combustion gas temperature T1T is 1,500° C. which is the upper limit value, under the current environment of the gas turbine 1.

Describing based on the CLCSO calculation logic shown in FIG. 8, first, a function generator 151 calculates the value of 1,500° C. MW (temperature control MW) based on the intake temperature of the actual measurement value, the IGV opening command value, and a turbine bypass ratio (turbine bypass flow rate/intake flow rate) obtained by dividing, with a divider 153, the turbine bypass flow rate of the actual measurement value by the intake flow rate of the actual measurement value (corresponding to the whole compressed air volume). That is, the value of 1,500° C. MW is obtained in consideration of the IGV opening, the intake temperature, and the turbine bypass ratio.

A function generator 152 calculates the value of 700° C. MW based on the intake temperature, the IGV opening command value, and the turbine bypass ratio. That is, the value of 700° C. MW is obtained in consideration of the IGV opening, the intake temperature, and the turbine bypass ratio.

A divider 154 divides the intake pressure (atmospheric pressure) of the actual measurement value by the standard atmospheric pressure set by a signal generator 161 to obtain the atmospheric pressure ratio (intake pressure/standard atmospheric pressure).

A multiplier 155 multiplies the value of 1,500° C. MW obtained by the function generator 151 and the atmospheric pressure ratio obtained by the divider 154 to obtain the value of 1,500° C. MW in consideration of the atmospheric pressure ratio as well.

The value of 1,500° C. MW obtained by the multiplier 155 may be output to a subtractor 157 via a learning circuit 162, or may directly be output to the subtractor 157. The learning circuit 162 is configured to correct a deviation in the value of 1,500° C. MW due to, for example, a characteristic degradation of the gas turbine 1.

A multiplier 156 multiplies the value of 700° C. MW obtained by the function generator 152 and the atmospheric pressure ratio obtained by the divider 154 to obtain the value of 700° C. MW in consideration of the atmospheric pressure ratio as well.

The subtractor 157 subtracts the value of 700° C. MW obtained by the multiplier 156 from the value of 1,500° C. MW obtained by the multiplier 155 (or corrected by the learning circuit 162) (1,500° C. MW–700° C. MW: see Equation (1) described above).

The subtractor 158 subtracts the value of 700° C. MW obtained by the multiplier 156 from the actual output, that is, the generator output (gas turbine output) of the actual measurement value (actual output –700° C. MW: see Equation (1) described above).

Then, a divider 159 divides the subtraction result of the subtractor 158 by the subtraction result of the subtractor 157 (see Equation (1) described above). The CLCSO can thus be calculated. In order to represent the CLCSO in percentage, it is only necessary to multiply the output value of the divider 159 by 100.

A rate setter 160 does not immediately output the input value from the divider 159 as the CLCSO but outputs the input value from the divider 159 by restricting the input value at a predetermined increase/decrease rate, so that each valve or the like for controlling the fuel flow rate does not frequently repeat opening and closing operations due to minute fluctuations in the CLCSO by, for example, minute fluctuations in the gas turbine output (generator output).

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A gas turbine combustor 4 according to at least one embodiment of the present disclosure, includes: a first fuel injector 41; a second fuel injector 42; a combustor liner 46 serving as a combustion part for burning fuel F injected from the first fuel injector 41 and the second fuel injector 42; a less combustible fuel flow control part 240L for controlling, independently of each other, amounts of less combustible fuel FL supplied to the first fuel injector 41 and the second fuel injector 42; a highly combustible fuel flow control part 240H for controlling, independently of each other, amounts of highly combustible fuel FH having a higher combustion speed than the less combustible fuel FL and supplied to the first fuel injector 41 and the second fuel injector 42; and a combustion control device 140 serving as a controller. The controller (combustion control device 140) is configured to control the less combustible fuel flow control part 240L and the highly combustible fuel flow control part 240H such that a relative ratio R of a first ratio R1 of the highly combustible fuel FH to whole of first fuel F1 injected by the first fuel injector 41 and a second ratio R2 of the highly combustible fuel FH to whole of second fuel F2 injected by the second fuel injector 42 changes according to an operating condition of a gas turbine 1.

With the above configuration (1), by changing the above-described relative ratio R according to the operating condition of the gas turbine 1, it is possible to achieve both the reduction in the output lower limit value in the turndown operation and the decrease in the risk of backfire.

(2) In some embodiments, in the above configuration (1), in the first fuel injector 41 and the second fuel injector 42, the above-described relative ratio R is preferably set such that a value obtained by dividing the first ratio R1 by the second ratio R2 (that is, the relative ratio R=R1/R2) is larger in a case where an index representing the operating condition is a first value a1 than in a case where the index is a second value a2 at which a load on the gas turbine 1 is high relative to the case where the index is the first value a1.

With the above configuration (2), since the above-described relative ratio R is set such that the value obtained by dividing the first ratio R1 by the second ratio R2 is larger in the case where the index representing the operating condition is the first value a1 than in the case where the index is the second value a2, if the first fuel injector 41 is the combustor having the higher risk of backfire than the second fuel injector 42, the above-described relative ratio R is desirable in order to achieve both the reduction in the output lower limit value in the turndown operation and the decrease in the risk of backfire.

(3) In some embodiments, in the above configuration (2), the controller (combustion control device 140) may be configured to control the less combustible fuel flow control part 240L and the highly combustible fuel flow control part 240H such that at least either of the first ratio R1 or the second ratio R2 is different between the case where the above-described index is the first value a1 and the case where the above-described index is the second value a2.

As in the above configuration (3), since at least either of the first ratio R1 or the second ratio R2 is different between the case where the above-described index is the first value a1 and the case where the above-described index is the second value a2, the above-described relative ratio R can be different between the case where the above-described index is the first value a1 and the case where the above-described index is the second value a2.

(4) In some embodiments, in the above configuration (2) or (3), the controller (combustion control device 140) may be configured to control the less combustible fuel flow control part 240L and the highly combustible fuel flow control part 240H such that the first ratio R1 is lower in the case where the above-described index is the second value a2 than in the case where the above-described index is the first value a1.

With the above configuration (4), even if the load on the gas turbine 1 becomes relatively large, it is possible to suppress the risk of backfire in the first fuel injector 41.

(5) In some embodiments, in any of the above configurations (2) to (4), the controller (combustion control device 140) may be configured to control the less combustible fuel flow control part 240L and the highly combustible fuel flow control part 240H such that the second ratio R2 is not lower than the first ratio R1 in the case where the above-described index is the second value a2.

With the above configuration (5), for example, if the first fuel injector 41 is the combustor having the higher risk of backfire than the second fuel injector 42, it is possible to make the second ratio R2 in the second fuel injector 42 relatively high while suppressing the risk of backfire in the first fuel injector 41 when the load on the gas turbine 1 becomes relatively large. For example, if the highly combustible fuel FH is fuel, such as hydrogen, having a relatively small environmental load, the environmental load can be suppressed by making the second ratio R2 relatively high.

(6) In some embodiments, in any of the above configurations (2) to (5), the controller (combustion control device 140) may be configured to control the less combustible fuel flow control part 240L and the highly combustible fuel flow control part 240H such that the second ratio R2 is at least 0.5 in the case where the above-described index is the second value a2.

With the above configuration (6), it is possible to make the second ratio R2 in the second fuel injector 42 relatively high when the load on the gas turbine 1 becomes relatively large. For example, if the highly combustible fuel FH is fuel, such as hydrogen, having a relatively small environmental load, the environmental load can be suppressed by making the second ratio R2 relatively high.

(7) In some embodiments, in any of the above configurations (1) to (6), the first fuel injector 41 may be a fuel injector of a premixed combustion type, and the second fuel injector 42 may be a fuel injector of a diffusion combustion type.

In general, the fuel injector of the diffusion combustion type is a combustor having the lower risk of backfire than the fuel injector of the premixed combustion type.

With the above configuration (7), the second fuel injector 42 is the combustor having the lower risk of backfire than the first fuel injector 41.

(8) In some embodiments, in any of the above configurations (1) to (7), a plurality of the first fuel injectors 41 may be disposed around a periphery of the second fuel injector 42.

In general, if a fuel injector is surrounded by a plurality of other fuel injectors, the surrounded fuel injector has the lower risk of backfire than the surrounding fuel injectors.

With the above configuration (8), the second fuel injector 42 is the combustor having the lower risk of backfire than the first fuel injector 41.

(9) In some embodiments, in any of the above configurations (1) to (7), the first fuel injector 41 may be disposed coaxially with the second fuel injector 42 and configured to inject the first fuel F1 from a periphery of the second fuel injector 42.

In general, if respective fuel injectors are configured such that one fuel injector is disposed coaxially with another fuel injector and the one fuel injector injects fuel from the periphery of the another fuel injector, the another fuel injector has the lower risk of backfire than the one fuel injector.

With the above configuration (9), the second fuel injector 42 is the combustor having the lower risk of backfire than the first fuel injector 41.

(10) In some embodiments, in any of the above configurations (1) to (9), the index representing the operating condition is preferably a gas turbine inlet combustion gas temperature T1T.

In general, the gas turbine inlet combustion gas temperature T1T is an index indicating the operating condition of the gas turbine 1 more accurately than, for example, the load on the gas turbine 1 (gas turbine output).

With the above configuration (10), since the operating condition of the gas turbine 1 can more accurately be reflected in the above-described relative ratio R, it is possible to improve the control accuracy of the above-described relative ratio R.

(11) In some embodiments, in any of the above configurations (1) to (9), the index representing the operating condition is preferably a dimensionless value (CLCSO) of a gas turbine inlet combustion gas temperature T1T.

As described above, the gas turbine inlet combustion gas temperature T1T is the index indicating the operating condition of the gas turbine 1 more accurately than, for example, the load on the gas turbine 1 (gas turbine output). However, in the gas turbine of recent years, the gas turbine inlet combustion gas temperature T1T has increased, making it difficult to measure the gas turbine inlet combustion gas temperature T1T for a long period of time. With the above configuration (11), since the above-described index is the dimensionless value (CLCSO) of the gas turbine inlet combustion gas temperature T1T, it is not necessary to measure the gas turbine inlet combustion gas temperature T1T for the long period of time, making it possible to easily improve the control accuracy of the above-described relative ratio R.

(12) In some embodiments, in any of the above configurations (1) to (9), the index representing the operating condition may be a load on the gas turbine 1.

The load on the gas turbine 1 is less accurate as the index representing the operating condition of the gas turbine 1 than, for example, the gas turbine inlet combustion gas temperature T1T, but the value of the load on the gas turbine 1 can easily be acquired.

With the above configuration (12), since the above-described index is the load on the gas turbine 1, it is possible to simplify the configuration for controlling the above-described relative ratio R.

(13) In some embodiments, in any of the above configurations (1) to (12), the less combustible fuel FL may be a natural gas, and the highly combustible fuel FH may be any of hydrogen, propane, or a mixture of hydrogen and propane.

As in the above configuration (13), the less combustible fuel FL may be the natural gas which is common fuel for the gas turbine 1. In this case, the highly combustible fuel FH may be any of hydrogen, propane, or the mixture of hydrogen and propane, which is fuel having a higher combustion speed than the natural gas. Thus, it is possible to suppress an increase in cost of the fuel F.

(14) A gas turbine 1 according to at least one embodiment of the present disclosure, includes: the gas turbine combustor 4 having any of the above configurations (1) to (13).

With the above configuration (14), it is possible to achieve both the reduction in the output lower limit value in the turndown operation and the decrease in the risk of backfire, and it is possible to widen an operating range of the gas turbine 1.

REFERENCE SIGNS LIST

1 Gas turbine
2 Compressor
4 Gas turbine combustor (combustor)
6 Turbine
41 First fuel injector
42 Second fuel injector
46 Combustor liner
50 Pilot combustion burner
60 Main combustion burner
140 Combustion control device
200 Supply system
240L Less combustible fuel flow control part
240H Highly combustible fuel flow control part

The invention claimed is:

1. A gas turbine combustor, comprising:
a first fuel injector for injecting fuel supplied from a first confluent portion where a less combustible fuel and a highly combustible fuel having a higher combustion speed than the less combustible fuel meet;
a second fuel injector for injecting fuel supplied from a second confluent portion, different from the first confluent portion, where the less combustible fuel and the highly combustible fuel meet;
a combustion part for burning fuel injected from the first fuel injector and the second fuel injector;
a first less combustible fuel flow control valve for controlling amounts of less combustible fuel supplied to the first fuel injector;
a second less combustible fuel flow control valve, different from the first less combustible fuel flow control valve, for controlling amounts of the less combustible fuel supplied to the second fuel injector;
a first highly combustible fuel flow control valve for controlling amounts of the highly combustible fuel supplied to the first fuel injector;
a second highly combustible fuel flow control valve, different from the first highly combustible fuel flow control valve, for controlling amounts of the highly combustible fuel supplied to the second fuel injector; and
a controller configured to control the first less combustible fuel flow control valve, the second less combustible fuel flow control valve, the first highly combustible fuel flow control valve and the second highly combustible fuel flow control valve such that a relative ratio of a first ratio of the highly combustible fuel to a total combined fuel injected by the first fuel injector and a second ratio of the highly combustible fuel to a total combined fuel injected by the second fuel injector changes according to an operating condition of a gas turbine,
wherein the second confluent portion is configured to supply a mixed fuel of the less combustible fuel and the highly combustible fuel when the mixed fuel of the less combustible fuel and the highly combustible fuel is being supplied from the first confluent portion.

2. The gas turbine combustor according to claim 1, wherein, in the first fuel injector and the second fuel injector, the relative ratio is set such that a value obtained by dividing the first ratio by the second ratio is larger when an index representing the operating condition is a first value than when the index is a second value at which a load on the gas turbine is high relative to when the index is the first value.

3. The gas turbine combustor according to claim 2, wherein the controller is configured to control the first less combustible fuel flow control valve, the second less combustible fuel flow control valve, the first highly combustible fuel flow control valve and the second highly combustible fuel flow control valve such that the first ratio or the second ratio is different when the index is the first value as compared to when the index is the second value.

4. The gas turbine combustor according to claim 2, wherein the controller is configured to control the first less combustible fuel flow control valve, the second less combustible fuel flow control valve, the first highly combustible fuel flow control valve and the second highly combustible fuel flow control valve such that the first ratio is lower when the index is the second value than when the index is the first value.

5. The gas turbine combustor according to claim 2, wherein the controller is configured to control the first less combustible fuel flow control valve, the second less combustible fuel flow control valve, the first highly combustible fuel flow control valve and the second highly combustible fuel flow control valve such that the second ratio is not lower than the first ratio when the index is the second value.

6. The gas turbine combustor according to claim 2, wherein the controller is configured to control the first less combustible fuel flow control valve, the second less combustible fuel flow control valve, the first highly combustible fuel flow control valve and the second highly combustible fuel flow control valve such that the second ratio is at least 0.5 when the index is the second value.

7. The gas turbine combustor according to claim 2, wherein the index representing the operating condition is a gas turbine inlet combustion gas temperature.

8. The gas turbine combustor according to claim 2, wherein the index representing the operating condition is a dimensionless value of a gas turbine inlet combustion gas temperature.

9. The gas turbine combustor according to claim 2, wherein the index representing the operating condition is a load on the gas turbine.

10. The gas turbine combustor according to claim 1, wherein the first fuel injector is a fuel injector of a premixed combustion type, and
wherein the second fuel injector is a fuel injector of a diffusion combustion type.

11. The gas turbine combustor according to claim 1, wherein a plurality of the first fuel injectors are disposed around a periphery of the second fuel injector.

12. The gas turbine combustor according to claim 1, wherein the first fuel injector is disposed coaxially with the second fuel injector and configured to inject the fuel from a periphery of the second fuel injector.

13. The gas turbine combustor according to claim 1, wherein the less combustible fuel is a natural gas, and
wherein the highly combustible fuel is any of hydrogen, propane, or a mixture of hydrogen and propane.

14. A gas turbine, comprising:
the gas turbine combustor according to claim 1.

* * * * *